United States Patent
Binder

(10) Patent No.: US 9,904,301 B2
(45) Date of Patent: Feb. 27, 2018

(54) IN-LINE PRESSURE RELIEF APPARATUS

(71) Applicant: White's Equipment Rental, LLC, Woodward, OK (US)

(72) Inventor: Buckly Binder, Woodward, OK (US)

(73) Assignee: White's Equipment Rental, LLC, Woodward, OK (US)

( * ) Notice: Subject to any disclaimer, the term of this patent is extended or adjusted under 35 U.S.C. 154(b) by 66 days.

(21) Appl. No.: 14/930,378

(22) Filed: Nov. 2, 2015

(65) Prior Publication Data
US 2017/0123438 A1 May 4, 2017

(51) Int. Cl.
F16K 17/14 (2006.01)
G05D 16/08 (2006.01)
F16K 17/40 (2006.01)

(52) U.S. Cl.
CPC ............. G05D 16/08 (2013.01); F16K 17/40 (2013.01)

(58) Field of Classification Search
CPC ................................ G05D 16/08; F16K 17/40
USPC ..... 137/68.11, 68.19, 115.01, 116.5, 118.06, 137/318, 798, 472, 473, 874; 251/51, 55, 251/153, 154, 367; 73/707, 716, 736, 73/747, 756; 285/1, 2, 3, 68, 70, 83, 285/125.1, 129.1, 306, 924; 138/89, 117, 138/26, 103, 177, 178; 166/113, 296, 166/297, 212, 317, 325
See application file for complete search history.

(56) References Cited

U.S. PATENT DOCUMENTS

| | | | | | |
|---|---|---|---|---|---|
| 712,759 | A | * | 11/1902 | Breen | F16K 13/04 137/247.51 |
| 725,275 | A | * | 4/1903 | McLean | F16L 13/126 285/125.1 |
| 765,484 | A | * | 7/1904 | Hochstein | B60P 3/20 138/89 |
| 1,518,595 | A | * | 12/1924 | Mauran | B01D 53/18 137/68.19 |
| 2,065,523 | A | * | 12/1936 | Groeniger | E03C 1/122 138/37 |
| 3,084,705 | A | * | 4/1963 | Feuer | F16K 13/04 137/68.12 |
| 4,126,151 | A | * | 11/1978 | Bullerdiek | F16K 17/16 137/43 |
| 4,842,004 | A | * | 6/1989 | Steinman | F16K 17/162 137/454.2 |
| 4,911,696 | A | * | 3/1990 | Miyasaka | A61M 39/221 137/68.11 |
| 4,913,184 | A | * | 4/1990 | Fallon | F16K 17/40 137/68.19 |

(Continued)

Primary Examiner — Minh Le
(74) Attorney, Agent, or Firm — Hall Estill Law Firm

(57) ABSTRACT

A pressure relief apparatus is disclosed herein. The pressure relief apparatus comprises a primary conduit for transporting fluid in a given direction. The pressure relief apparatus also includes a secondary conduit intersecting the primary conduit at an angle such that the secondary conduit extends from away from the primary conduit in a direction opposite of the given direction of the transported fluid in the primary conduit. The pressure relief apparatus further comprises a rupture disk disposed in the secondary conduit designed to fail when pressure of the transported fluid in the primary conduit increases above a desired pressure threshold. A method of passing fluid through the pressure relief apparatus is also provided herein.

18 Claims, 4 Drawing Sheets

(56) References Cited

U.S. PATENT DOCUMENTS

| | | | | |
|---|---|---|---|---|
| 4,951,697 A * | 8/1990 | Fritts | F16K 17/1606 | 116/266 |
| 5,033,510 A * | 7/1991 | Huber | E03F 7/02 | 137/68.19 |
| 5,069,291 A * | 12/1991 | O'Connell | A62C 35/00 | 137/68.11 |
| 5,086,802 A * | 2/1992 | Spears | E21B 33/072 | 137/498 |
| 5,154,202 A * | 10/1992 | Hibler, Jr. | F16K 17/162 | 137/565.35 |
| 6,063,198 A * | 5/2000 | Bang | C23C 16/44 | 118/692 |
| 6,178,759 B1 * | 1/2001 | Key | F16K 17/16 | 137/68.19 |
| 6,240,948 B1 * | 6/2001 | Hansen, III | F16K 17/1606 | 137/68.19 |
| 6,491,109 B2 * | 12/2002 | Christenson | A62C 3/004 | 137/68.19 |
| 6,575,026 B1 * | 6/2003 | DeBar | G01L 7/20 | 73/202 |
| 6,601,610 B1 * | 8/2003 | Mitomo | B65G 53/56 | 137/625.47 |
| 6,843,121 B1 * | 1/2005 | DeBar | B41J 2/175 | 73/202 |
| 7,004,187 B2 * | 2/2006 | Hoffman | B01J 19/002 | 137/14 |
| 7,337,675 B2 * | 3/2008 | Huang | G01F 1/36 | 73/715 |
| 8,066,032 B2 * | 11/2011 | Zeloof | F16K 7/10 | 123/198 D |
| 8,783,293 B2 * | 7/2014 | Morris | F16L 41/023 | 137/874 |
| 8,943,894 B2 * | 2/2015 | Geipel | A61M 5/141 | 73/700 |
| 2005/0051210 A1 * | 3/2005 | Zikeli | F16L 57/00 | 137/68.19 |
| 2011/0005857 A1 * | 1/2011 | Pommerer | F01N 1/065 | 181/212 |
| 2013/0052552 A1 * | 2/2013 | Phan | G01L 7/18 | 429/427 |
| 2013/0126152 A1 * | 5/2013 | Banks | E21B 43/26 | 166/53 |
| 2014/0014191 A1 * | 1/2014 | Kyllingstad | E21B 21/106 | 137/12 |

* cited by examiner

IN-LINE PRESSURE RELIEF APPARATUS

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE DISCLOSURE

1. Field of the Invention

The present disclosure relates to a pressure relief apparatus incorporated into a conduit transporting fluid that safely fails when the pressure of the fluid increases above a certain threshold.

2. Description of the Related Art

Fluid being transported via piping or conduits needs to be kept below certain pressures for various reasons, such as for preservation of certain properties of the fluid and for safety concerns. There are numerous complex mechanical devices for measuring the pressure of fluid and opening valves when fluid increases above a certain threshold.

Accordingly, there is a need for a simple apparatus that can let off pressure from a fluid being transported in piping or conduit and provide some notice to an operator that the pressure of the fluid in the piping or conduit is above the desired pressure threshold.

SUMMARY OF THE DISCLOSURE

The disclosure of this application is directed to a pressure relief apparatus. The pressure relief apparatus comprises a primary conduit for transporting fluid in a given direction. The pressure relief apparatus also includes a secondary conduit intersecting the primary conduit at an angle such that the secondary conduit extends from away from the primary conduit in a direction opposite of the given direction of the transported fluid in the primary conduit. The pressure relief apparatus further comprises a rupture disk disposed in the secondary conduit designed to fail when pressure of the transported fluid in the primary conduit increases above a desired pressure threshold. The disclosure is also directed toward a method of passing fluid through the pressure relief apparatus.

DETAILED DESCRIPTION OF THE DISCLOSURE

Figure 1:
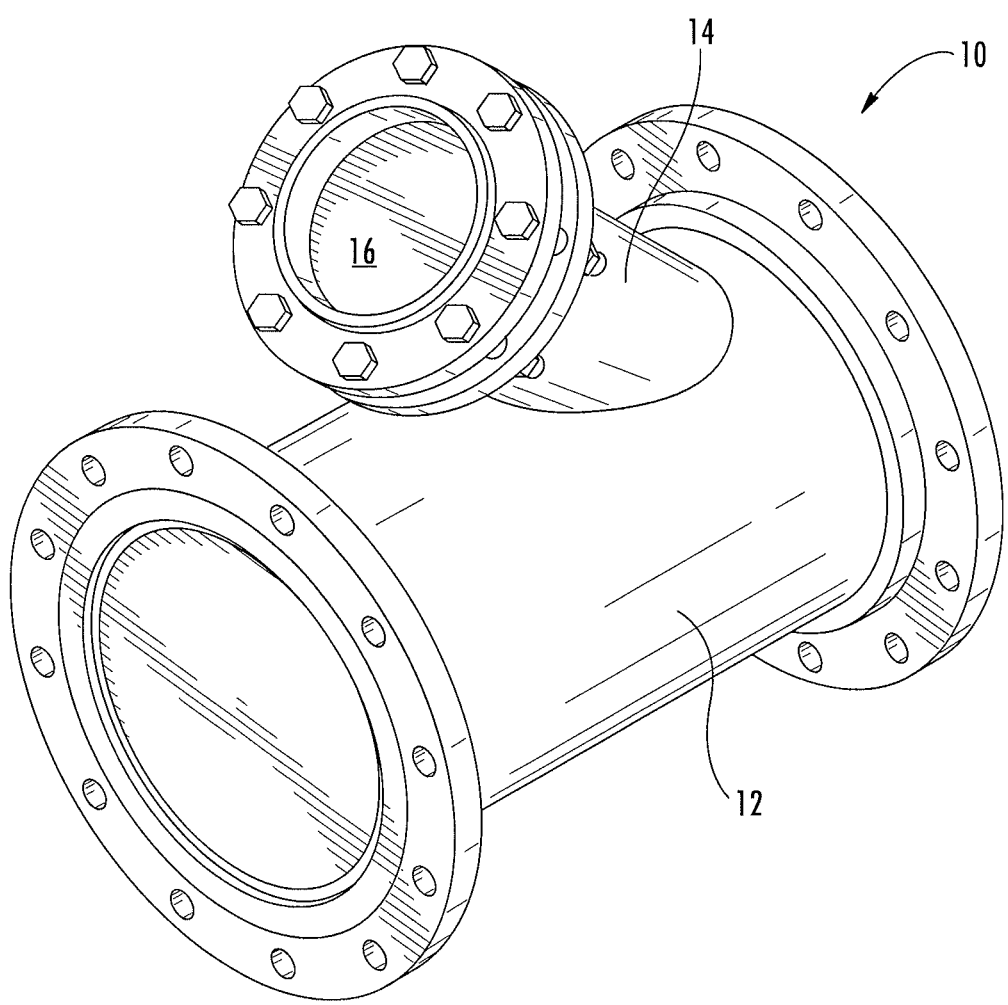
FIG. 1 is a perspective view of a pressure relief apparatus constructed in accordance with the present disclosure.
Figure 2:
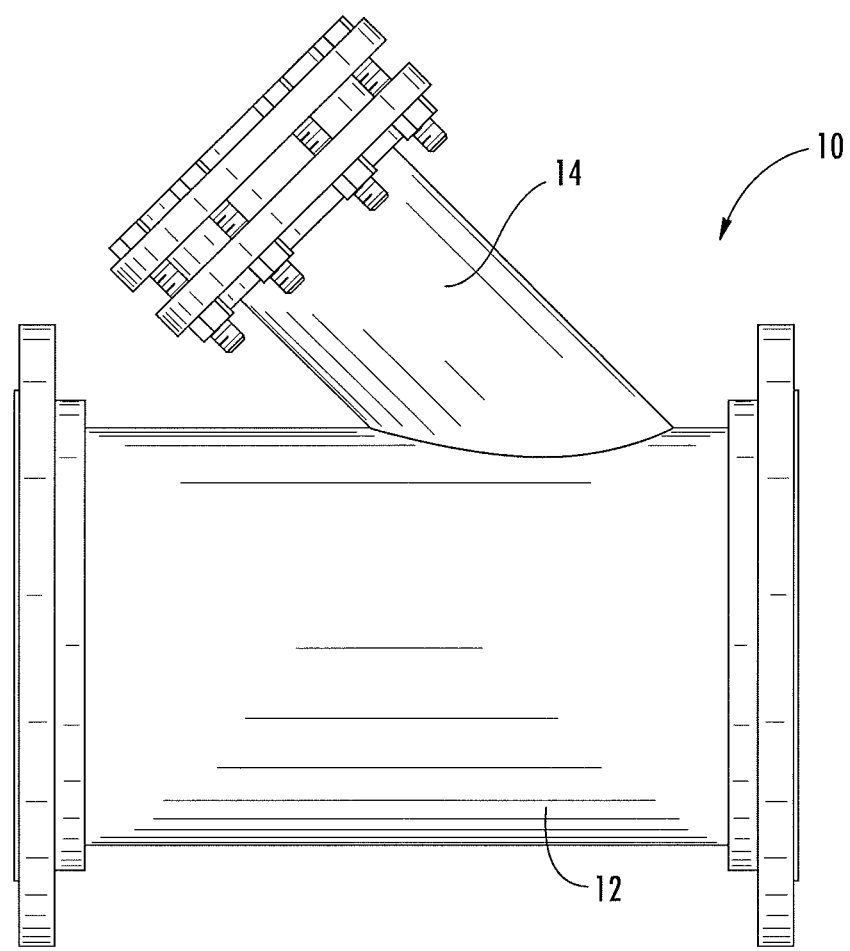
FIG. 2 is a side elevation view of the pressure relief apparatus constructed in accordance with the present disclosure.
Figure 3:
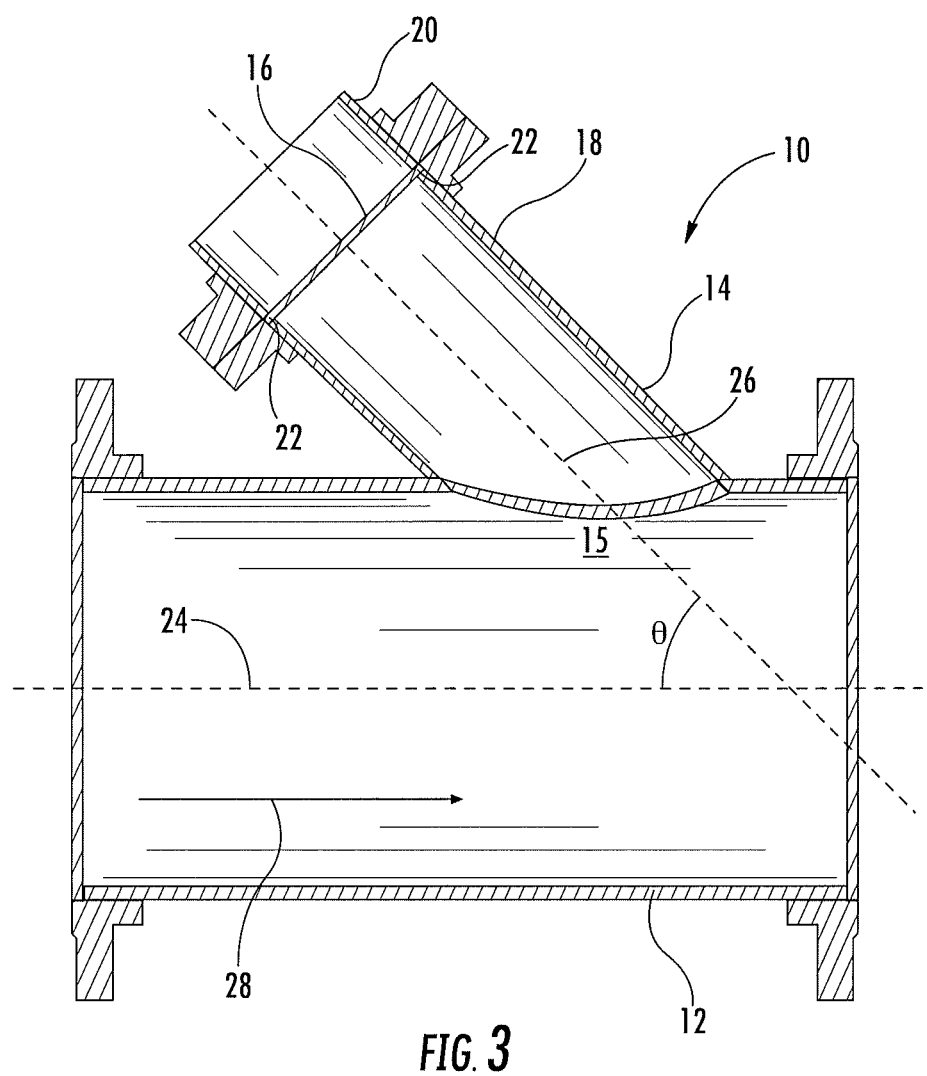
FIG. 3 is a cross-sectional view of the pressure relief apparatus constructed in accordance with the present disclosure.

Referring to FIGS. 1-3, there is shown a pressure relief apparatus 10 includes a primary conduit 12 for transporting fluid and a secondary conduit 14 branched off from the primary conduit 12 and in fluid communication with the primary conduit 12. The primary conduit 12 and the secondary conduit 14 can be any size such that they both can perform their intended functions. A transition area 15 exists where the secondary conduit 14 intersects the primary conduit 12. Internal portions and internal surfaces of the pressure relief apparatus, primarily at the transition area 15, are treated in such a manner that turbulent flow is minimized as fluid is transported through the primary conduit 12.

The secondary conduit 14 includes a rupture disk 16 that can be positioned at any location therein that fails when the pressure of the fluid passing through the primary conduit 12 increases above a desired pressure threshold. The rupture disk 16 can be designed to fit in the secondary conduit 14 and fail at any desired pressure threshold. Once the rupture disk 16 fails, fluid can escape the primary conduit 12 via the secondary conduit 14. Fluid passing through the secondary conduit 14 does two things. First, it relieves pressure build up in the primary conduit 12 and, secondly, it provides a warning to an operator that the fluid flowing through the primary conduit 12 has increased above the desired pressure threshold.

The rupture disk 16 can be constructed of any material known in the art for being placed in the secondary conduit 14. Furthermore, the rupture disk 16 can be secured in the secondary conduit 14 via any means known in the art. In one embodiment, the secondary conduit 14 can be constructed of a first portion 18 and a second portion 20 whereby an outer circumferential portion 22 of the rupture disk 16 is securely positioned between the first portion 18 of the rupture disk 16 and the second portion 20 of the rupture disk 16. In this embodiment, the diameter of the rupture disk 16 would be larger than the inner diameter 22 of the secondary conduit 14.

The primary conduit 12 has a centerline 24 and the secondary conduit 14 has a centerline 26 that are depicted by dashed lines. The centerlines 24 and 26 of the primary conduit 12 and the secondary conduit 14 intersect at an angle θ. Fluid flows through the primary conduit 12 in the direction of arrow 28.

The centerline 26 of the secondary conduit 14 can intersect the centerline 24 of the primary conduit 12 at any angle θ such that fluid flowing through the primary conduit 12 is not turbulent. In one embodiment, the centerline 26 of the secondary conduit 14 intersects the centerline 24 of the primary conduit 12 at an angle θ that is in the range between 0° and 90°. In another embodiment, the centerline 26 of the secondary conduit 14 intersects the centerline 24 of the primary conduit 12 at an angle θ that is in the range between 20° and 70°. In yet another embodiment, the centerline 26 of the secondary conduit 14 intersects the centerline 24 of the primary conduit 12 at an angle θ that is in the range between 40° and 50°. In a further embodiment of the present disclosure, the centerline 26 of the secondary conduit 14 intersects the centerline 24 of the primary conduit 12 at an angle θ that is about 45°.

Figure 4:
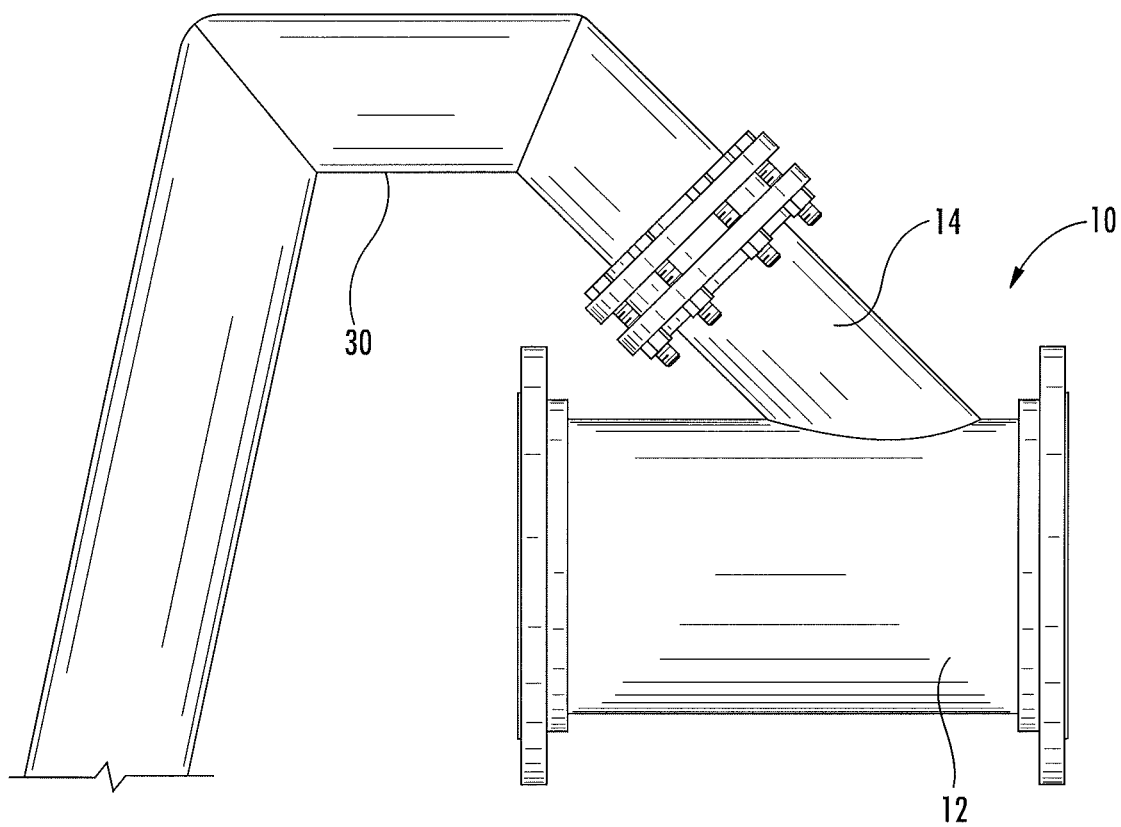
FIG. 4 is a side elevation view of another embodiment of a pressure relief apparatus constructed in accordance with the present disclosure.

Referring now to FIG. 4, the pressure relief apparatus 10 can include a fluid directing apparatus 30 attached to the secondary conduit 14 to direct fluid passing through the secondary conduit 14 after the rupture disk 16 fails to a predetermined location. The fluid directing apparatus 30 can be any type of conduit attachable to the secondary conduit 14 downstream of the rupture disk 16.

From the above description, it is clear that the present disclosure is well adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A pressure relief apparatus, the apparatus comprising:
a primary conduit for transporting fluid in a given direction;
a secondary conduit intersecting the primary conduit in a direction having an angle greater than 0 degrees and less than 90 degrees with respect to the opposite direction of the given direction of the transported fluid in the primary conduit; and
a rupture disk disposed in the secondary conduit designed to fail when pressure of the transported fluid in the primary conduit increases above a desired pressure threshold.

2. The apparatus of claim 1 wherein the angle is the angle between a centerline extending through the primary conduit and a centerline extending through the secondary conduit.

3. The apparatus of claim 2 wherein the angle is in a range of from about 20° to about 70°.

4. The apparatus of claim 2 wherein the angle is in a range of from about 40° to about 50°.

5. The apparatus of claim 1 wherein the secondary conduit is comprised of a first portion and a second portion.

6. The apparatus of claim 5 wherein the rupture disk is disposed between the first portion of the secondary conduit and the second portion of the secondary conduit.

7. The apparatus of claim 6 wherein the rupture disk has a larger diameter than an inner diameter of the secondary conduit.

8. The apparatus of claim 1 further comprising a fluid directing apparatus supported by the secondary conduit for transporting fluid from the secondary conduit to another location if the rupture disk were to fail.

9. The apparatus of claim 1 wherein a transition area exists where the secondary conduit intersects the primary conduit and internal portions and surfaces of the apparatus are treated such that turbulent flow of fluid through the primary conduit is limited.

10. A method, the method comprising:
passing fluid through a pressure relief apparatus, the pressure relief apparatus comprising:
a primary conduit for transporting fluid in a given direction;
a secondary conduit intersecting the primary conduit in a direction having an angle greater than 0 degrees and less than 90 degrees with respect to the opposite direction of the given direction of the transported fluid in the primary conduit; and
a rupture disk disposed in the secondary conduit designed to fail when pressure of the transported fluid in the primary conduit increases above a desired pressure threshold.

11. The method of claim 10 wherein the angle is the angle between a centerline extending through the primary conduit and a centerline extending through the secondary conduit.

12. The method of claim 11 wherein the angle is in a range of from about 20° to about 70°.

13. The method of claim 11 wherein the angle is in a range of from about 40° to about 50°.

14. The method of claim 10 wherein the secondary conduit is comprised of a first portion and a second portion.

15. The method of claim 14 wherein the rupture disk is disposed between the first portion of the secondary conduit and the second portion of the secondary conduit.

16. The method of claim 15 wherein the rupture disk has a larger diameter than an inner diameter of the secondary conduit.

17. The method of claim 10 further comprising a fluid directing apparatus supported by the secondary conduit for transporting fluid from the secondary conduit to another location if the rupture disk were to fail.

18. The method of claim 10 wherein a transition area exists where the secondary conduit intersects the primary conduit and internal portions and surfaces of the apparatus are treated such that turbulent flow of fluid through the primary conduit is limited.

* * * * *